(12) United States Patent
Bella

(10) Patent No.: US 6,817,137 B1
(45) Date of Patent: Nov. 16, 2004

(54) FISHING APPARATUS

(76) Inventor: Paul Daniel Bella, 1436 E. 89th St. South, Haysville, KS (US) 67060

( * ) Notice: Subject to any disclaimer, the term of this patent is extended or adjusted under 35 U.S.C. 154(b) by 0 days.

(21) Appl. No.: 10/725,713

(22) Filed: Dec. 2, 2003

(51) Int. Cl.[7] .............................................. A01K 91/00
(52) U.S. Cl. ................................................... 43/44.92
(58) Field of Search ............................ 43/44.92, 42.72, 43/15, 44.9

(56) References Cited

U.S. PATENT DOCUMENTS

| | | | | |
|---|---|---|---|---|
| 155,266 A | * | 9/1874 | Sprague | 43/15 |
| 542,917 A | * | 7/1895 | Bardsley | 43/15 |
| 1,295,448 A | * | 2/1919 | Dingwell | 43/15 |
| 1,614,931 A | * | 1/1927 | Pennell | 43/15 |
| 1,723,814 A | * | 8/1929 | Scholl | 43/15 |
| 2,065,854 A | * | 12/1936 | Edel et al. | 43/44.92 |
| 2,481,453 A | * | 9/1949 | Stadelhofer | 43/15 |
| 2,606,390 A | * | 8/1952 | Farmer | 43/42.72 |
| 2,631,399 A | * | 3/1953 | Sowa | 43/15 |
| 2,665,903 A | * | 1/1954 | Green | 267/73 |
| 2,712,194 A | * | 7/1955 | Di Stefano | 43/15 |
| 2,748,524 A | * | 6/1956 | Schinzel | 43/44.83 |
| 2,784,515 A | * | 3/1957 | McBride et al. | 43/15 |
| 2,801,487 A | * | 8/1957 | Morgan | 43/15 |
| 2,932,112 A | * | 4/1960 | Graves, Jr. | 43/42.02 |
| 3,060,615 A | * | 10/1962 | Spets | 43/15 |
| 3,693,275 A | * | 9/1972 | Craig | 43/15 |
| 4,586,283 A | | 5/1986 | Vocal | |
| 4,848,020 A | * | 7/1989 | Lash | 43/17.2 |
| 4,869,240 A | * | 9/1989 | Boren | 602/32 |
| 5,832,654 A | * | 11/1998 | McQueeny | 43/42.04 |
| 6,152,081 A | * | 11/2000 | Baker | 119/498 |
| 6,173,524 B1 | * | 1/2001 | Kinchen, Sr. | 43/43.1 |
| 6,405,474 B1 | * | 6/2002 | Taunton | 43/15 |

* cited by examiner

*Primary Examiner*—Michael J. Ramirez
*Assistant Examiner*—Jordan Lofdahl

(57) ABSTRACT

A fishing apparatus includes a float, first and second fishing lines and a spring biased leader. The first fishing line is connected at its opposite end to a spring biased leader which is associated with the float. The second fishing line has a proximate end and an opposite distal end for attaching a fish catching device such as a baited hook. The spring biased leader communicates between the first fishing line and the second fishing line. The spring biased leader includes, in a parallel arrangement, a spring and a non-resilient leader line which is longer than the unextended length of the spring. A fish striking at the distal end of the second fishing line must cause the extension of the spring biased leader before applying maximum tension on either the first or second fishing lines thus preventing the fish from applying a sudden breaking force to either fishing line.

13 Claims, 4 Drawing Sheets

# FISHING APPARATUS

FIELD OF THE INVENTION

This invention relates to a fishing apparatus for catching fish with an unattended line.

BACKGROUND OF THE INVENTION

An often used method of fishing for relatively large fresh water fish including baiting a line and leaving a line unattended. This often referred to as setting a trout line or a branch line. Typically, this method is used to catch large fresh water fish such as catfish in excess of ten pounds. Similar methods are also used for ice fishing. Such unattended fishing lines can also be deployed by anglers from a boat. Unattended fishing lines are often in a slack condition or suspended from a float and therefore fail to provide the progressive increase in line tension that is most suitable for setting a hook to catch a fish for retaining a fish once hook is set.

BRIEF DESCRIPTION OF THE INVENTION

In an embodiment of the present invention the aforementioned problem is addressed by providing a fishing apparatus including a first fishing line that is secured to a fixed object for retrieval by an angler, a second fishing line for carrying a fish catching device such as a baited fishing hook or other such fishing tackle for attracting and hooking a fish, a float and a spring biased leader associated with the float which communicates between the first fishing line and the second fishing line. The float includes an upper surface and a lower surface and preferably includes a substantially straight, vertical passageway extending between the top upper and lower surface. A first link element is positioned above the passageway and is attached to the first fishing line. A second link element is positioned below the passageway and is attached to the second fishing line. The first and second link elements are preferably barrel swivels which are to large to pass through the float passageway. The spring biased leader connects between the first and second link elements. The spring biased leader includes a spring which can stretch from an unextended length to an extended length an a non-resilient leader line which is longer than the unextended length of the spring. The spring and the leader line communicate between the first and second barrel swivels in a parallel fashion so that the leader may extend while the leader line is slack but is limited from further extension when the leader line becomes taut. its distal end. Fish catching device 7A for example, may comprise a baited hook as shown in FIG. 1 or, for example, a lure having hooks and other fishing tackle such as fishing weights and the like.

With the above described arrangement, tension can be applied to the second fishing line until the spring of the spring biased leader stretches to reach a length which is limited by the leader line. Accordingly, a fish playing the second fishing line, first, pulls against the float, then, causes the spring of the spring biased leader to extend until its extension is limited by the leader line and then finally pulls via the second fishing line against the first fishing line via the taut leader line of the spring biased leader portion. This progressive increase in resistance seems increases the likelihood of a fish being hooked and seems to decrease the likelihood that a fish can break a line by suddenly increasing tension in the unattended line.

DETAILED DESCRIPTION

Figure 1:
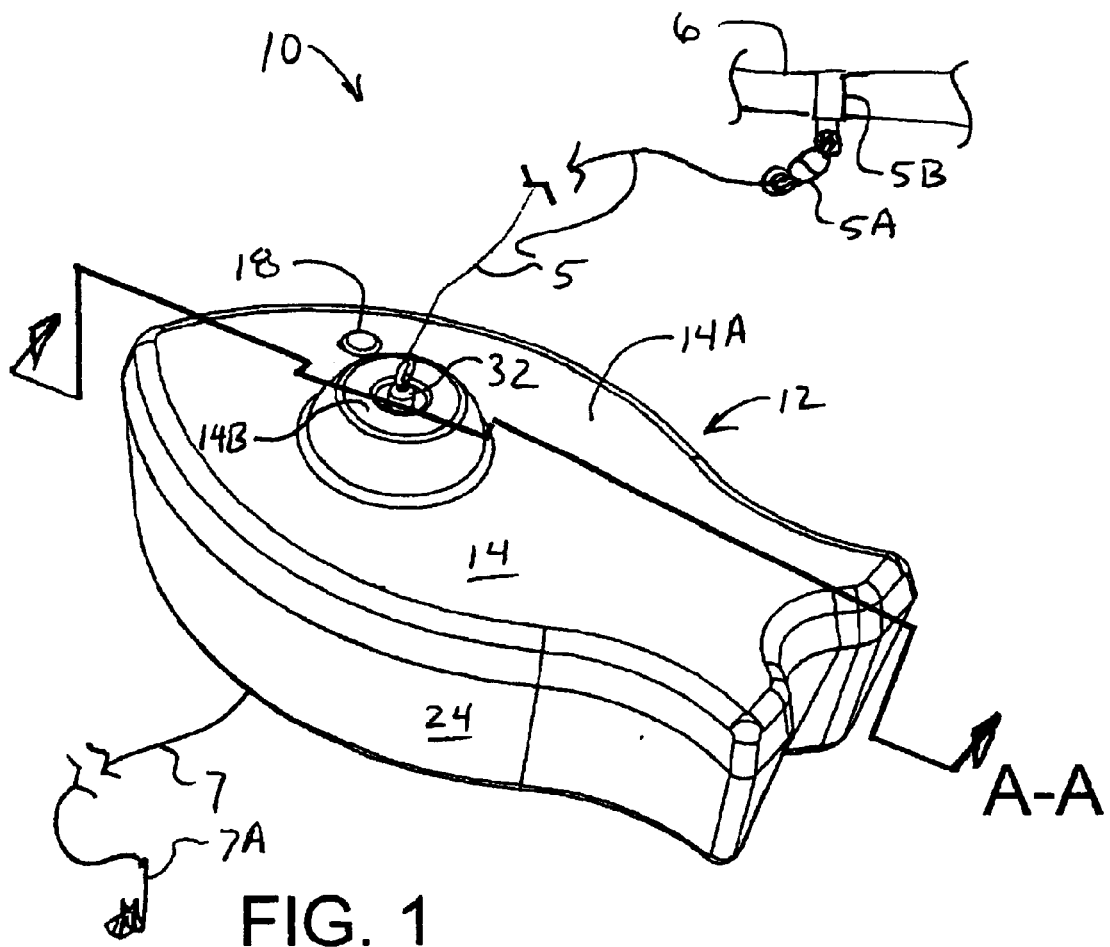
FIG. 1 is a perspective view of the fishing apparatus as viewed from above the fishing apparatus.
Figure 2:
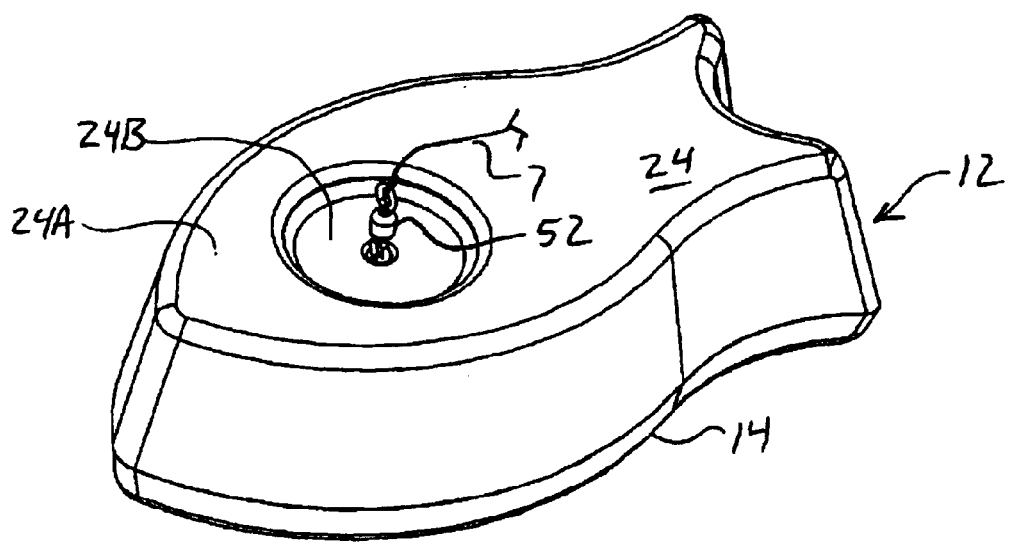
FIG. 2 is a perspective view of the fishing apparatus as viewed from below the fishing apparatus.

Turning now to the drawings, wherein like reference numbers identify identical or corresponding elements, and more particularly to FIG. 1 thereof, a fishing apparatus 10 is shown including a float 12, a first fishing line 5 and a second fishing line 7. First fishing line 5 is typically connected at its proximate end to a fixed object such as tree branch 6 preferably by means of a barrel swivel 5A and clamp 5B. Barrel swivel 5A is a typical barrel swivel of the type well known in the art having two portions which can rotate relative to each other. Barrel swivels allow connected lines to rotate without twisting or tangling. Preferably, when fishing apparatus 10 is used to fish for larger, fresh water fish, first fishing line 5 is arranged with approximately 25 feet of slack. Second fishing line 7 carries a fish catching device 7A at its distal end. Fish catching device 7A for example, may comprise a baited hook as shown in FIG. 1 or, for example, a lure having hooks and other fishing tackle such as fishing weights and the like.

Figure 3:
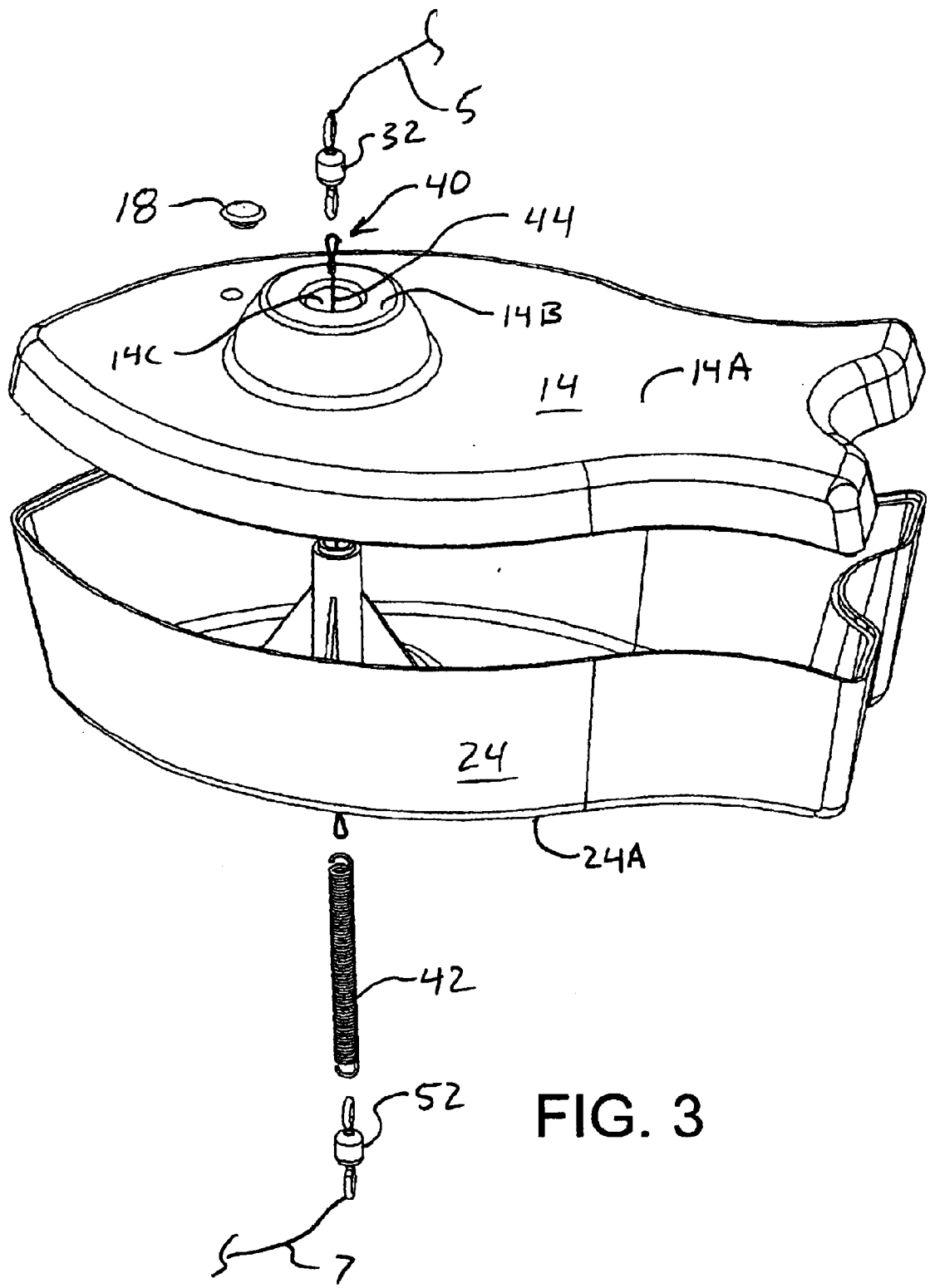
FIG. 3 is an exploded perspective view of the fishing apparatus.

In FIG. 3, fishing apparatus 10 is shown to include first fishing line 5, buoyant float 12, a first barrel swivel 32, a spring biased leader 40, a second barrel swivel 52 and second fishing line 7. First barrel swivel 32 functions as a link element for connecting the distal end of first fishing line 5 with spring biased leader 40. Similarly, second barrel swivel 52 functions as a link element for connecting spring biased leader 40 and the proximate end of second fishing line 7. Barrel swivels 32 and 52 allow the relative rotation of second fishing line 7, spring biased leader 40 and first fishing line 5. The use of fast and second barrel swivels 32 and 52 prevents the twisting and tangling of first fishing line 5 and second fishing line 7.

Figure 4:
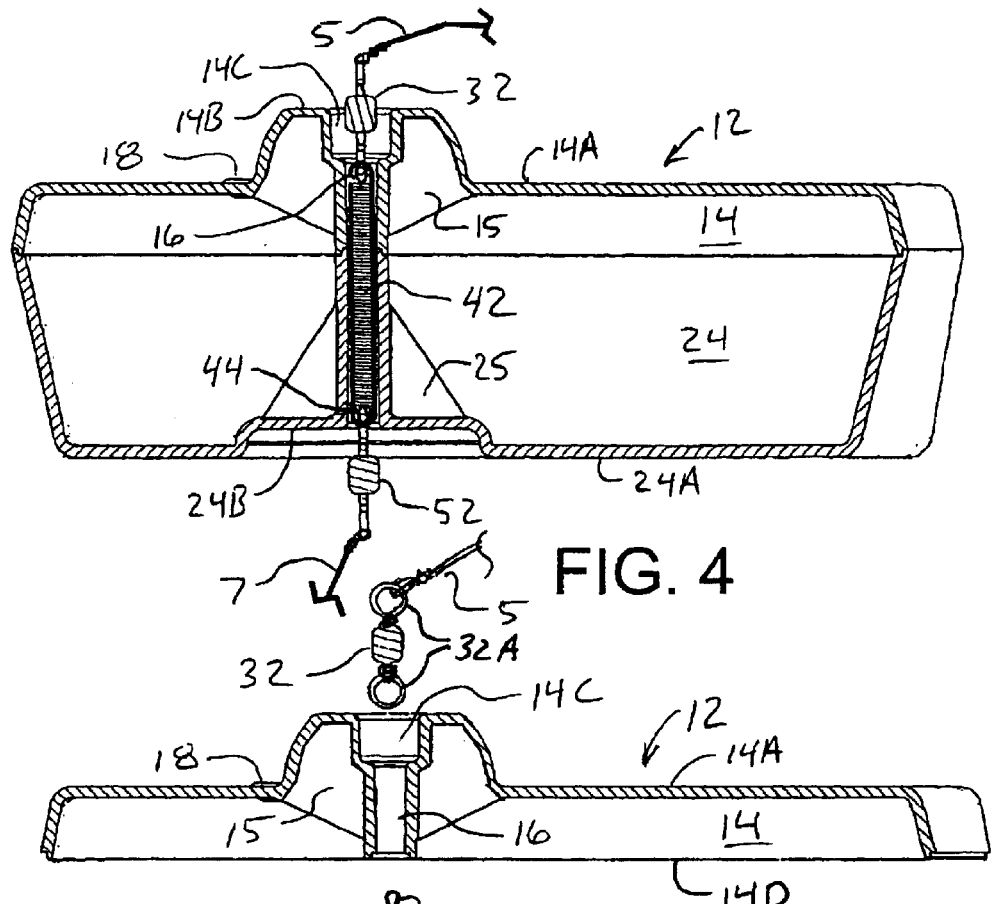
FIG. 4 is a cross section view of the fishing apparatus taken from plane A—A of FIG. 1.
Figure 5:
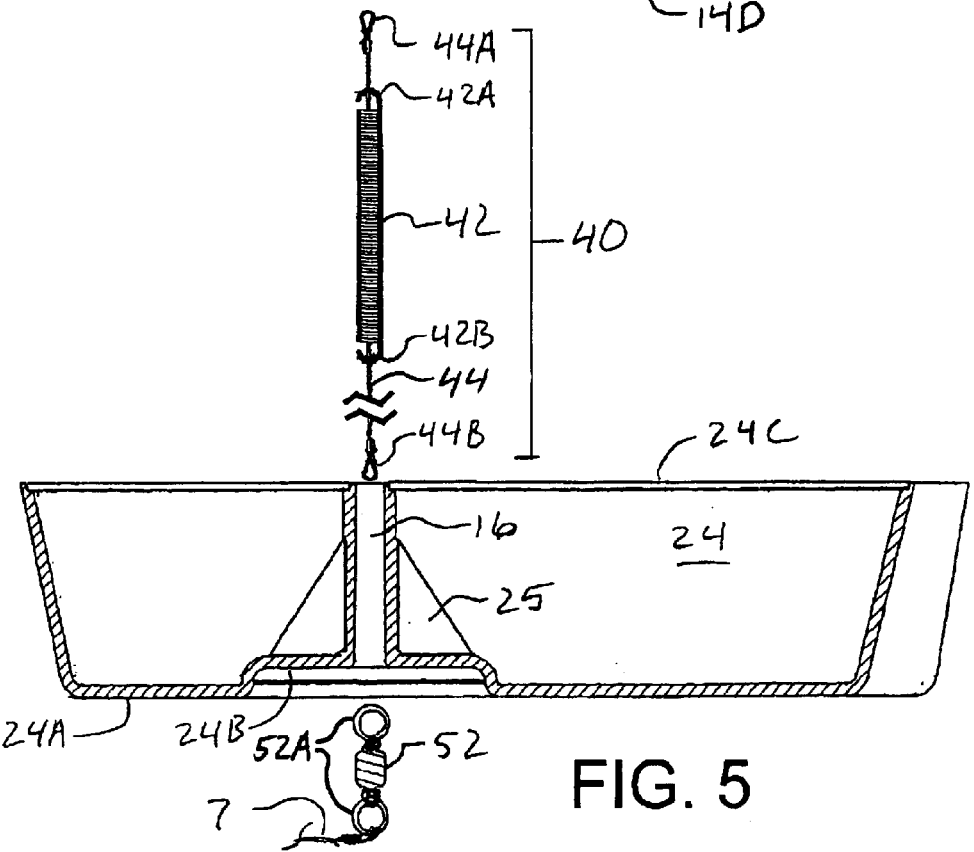
FIG. 5 is an exploded cross section view of the fishing apparatus.
Figure 6:
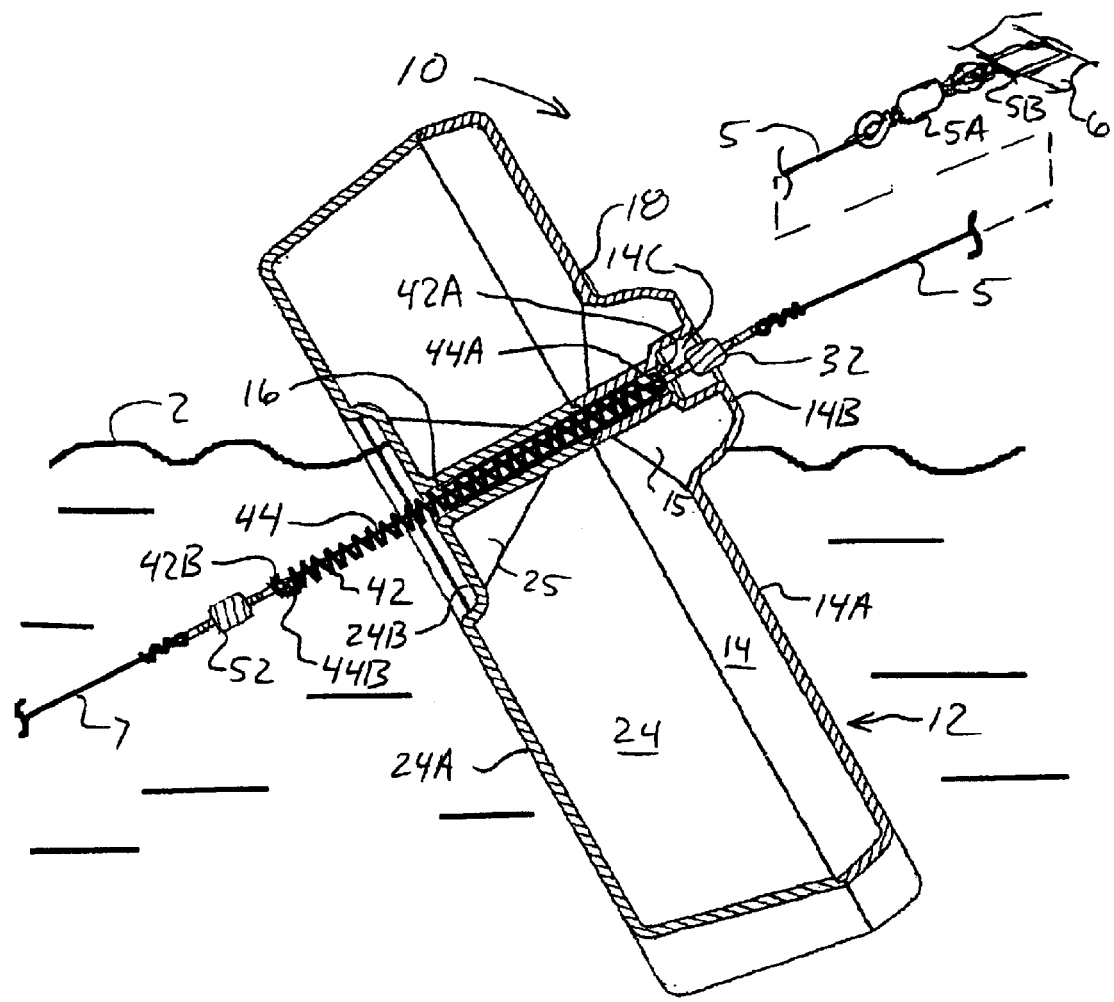
FIG. 6 is a cross section view of the fishing apparatus with the spring biased leader in the extended position.

Spring biased leader 40, when under sufficient tension, extends from an unextended length as shown in FIG. 4 to an extended length as shown in FIG. 6. Spring biased leader 40 includes a spring 42 and a generally non-resilient leader line 44. As can be best seen in FIG. 5, spring 42 and leader line 44 are each connected at their respective opposite ends to barrel swivels 32 and 52. Accordingly, spring 42 and leader line 44 connect between first and second fishing lines 5 and 7 in a parallel fashion As can be best seen in FIG. 5, the length of leader line 44 is greater than the unextended length of spring 42 Leader line 44 is preferably fashioned from a generally unyielding small diameter stainless steel cable and includes a first looped end portion 44A for connecting to barrel swivel 32 and an opposite second looped end portion 44B for connecting to barrel swivel 52. Spring 42 includes a first end hook 42A for connecting to barrel swivel 32 and a second end hook 42B for connecting to barrel swivel 52. Spring 42 is preferably a stainless steel spring and is preferably maintained in a slack, unextended condition In an example embodiment for catching large fresh water fish, spring 42, when not extended, may, for example, be three inches long while leader line 44 may be five or six inches in length. With such an example embodiment, spring 42 may have a spring constant of eight pounds per inch. Accordingly, a tension of between approximately 16 and 24 pounds may be needed to fully extend spring biased leader 40. Smaller fish may be best caught with the Sane example arrangement except that spring 42 might preferably be selected with a spring constant of approximately 4 pounds per inch.

Buoyant float 12 supports spring biased leader 40. More particularly, float 12 supports barrel swivel 32 which in turn supports leader 40. Float 12 includes an upper portion 14, a lower portion 24, a central passageway 16 and a pressure valve 18. Float 12 is generally hollow and water-tight. In the embodiment shown and described here, upper portion 14 and lower portion 24 are fashioned from injection molded plastic and are bonded together with a typical process known in the art. One typical process would include the steps of first dipping mating edges 14D and 24C in separate reactants which react exothermally and then bringing mating edges 14D and 24C into contact thus causing the plastic of upper portion 14 and lower portion 24 at mating edges 14D and 24C to heat, melt and fuse. Pressure valve 18 is for equalizing the internal air pressure of float 12 with outside air pressure. Four evenly radially spaced fins 15 reinforce the walls of passageway 16 in upper portion 14 and four evenly spaced fins 25 reinforce the walls of central passageway 16 in lower portion 24. Plane A—A of FIG. 1, is slightly offset so that fins 15 and 25 are exposed rather than sectioned in FIG. 3 and subsequent figures. Upper portion 14 includes an upper surface 14A having a raised portion 14B. Raised portion 14B supports line 5 above float 12 thus reducing the chance that line 5 will tangle with float 12. A pocket 14C defined in raised portion 14B receives barrel swivel 32. Lower surface 24A of lower portion 24 includes a recessed surface 24B. Passageway 16 is placed in an offset location toward forward end of float 12 to allow float 12 to weather vane in a stable manner into the wind and remain level while supporting second fishing line 7.

As can be seen in FIG. 4, passageway 16 has a smaller diameter than the widest portion of barrel swivel 32 so that barrel swivel 32 does not descend into or pass through passageway 16. Similarly, the widest portion of barrel swivel 52 is too large to pass through passageway 16. As can be seen in FIG. 5, the widest portions of barrel swivels 32 and 52 are pairs of rigid wire circlets 32A and 52A at either end of each barrel swivel. While passageway 16 is too small to accommodate the widest portions of barrel swivels 32 and 52, it is large enough to accommodate spring 42 of spring biased leader 40. Accordingly, the diameters of the widest portions of barrel swivels 32 and 52 are greater than the diameter of passageway 16 and the diameter of passageway 16 is greater than leader 40, so that float 12 can carry leader 40. Passageway 16 must also have a length that is less than the length of leader line 44. It is also preferable that passageway 16 be short enough to allow barrel swivels 32 and 52 to be connected to hooks 42A and 42B of spring 42 when spring 42 is in the unextended condition as shown in FIG. 4.

Fishing apparatus 10 can be understood as a tethered float which carries a spring biased leader having a limited range of elastic extension which in turn connects to a fishing line. Fishing apparatus 10 reacts progressively to the tension applied by a fish by first taking up the slack in line 5 as the fish moves float 12 and then by providing a reacting tension as spring 42 of leader 40 extends until leader 44 is taut. Once leader 44 is taut, additional force applied by a hooked fish is resisted by lines 5 and 7 and leader 44. This arrangement also prevents a sudden increase in tension in line 5 or 7 which could cause line 5 or 7 to break thus allowing the fish to escape.

Accordingly, fishing apparatus 10 provides a simple and effective means for landing a fish, particularly a large fresh water fish with an unattended fishing line. Fishing apparatus 10 includes a float which in turn supports a means for progressively yielding to the forces applied by a fish until the fish is securely hooked. As noted above, the various portions of fishing apparatus 10 are linked together with barrel swivels for preventing the twisting and tangling of fishing lines. Taken together, fishing apparatus 10 increases the probability of successfully landing a fish with an unattended line by more effectively setting the fishing hook and by minimizing the ability of a hooked fish to break or tangle the unattended fishing line.

A method for using fishing apparatus 10 can be understood by referring to FIGS. 5 and 6. The float portion of fishing apparatus is assembled by threading leader 44 and spring 42 through passage 16, barrel swivels 32 and 52 are attached to hooks 42A and 42B of spring 42 and first and second looped end portions 44A and 44B of leader line 44. Note that the length of leader line 44 must be longer than the unextended length of spring 42. First fishing line 5 is attached to upper circlet 32A of barrel swivel 32 and then secured at its opposite end to a fixed object 6 for easy retrieval such as a tree branch. A second fishing line 7 is attached to lower eyelet 52A of barrel swivel 52. Fishing hook 7A as shown in FIG. 1 or some other appropriate fish catching device may be secured to the distal end of second fishing line 7. Float 12 is then deployed so that it floats on the surface of a water body 2 such that first fishing line 5 has substantial slack on the order of 25 feet When a fish (not shown) takes the hook and pulls on line 7, float 12 may be brought into a position as shown in FIG. 6. In FIG. 6, sufficient tension on second fishing line 7, has causal spring 42 to extend until leader 44 is taut and until float 12 is tilted with respect to the surface of water body 2. Although the fish may subsequently relax tension and then reapply tension, a very sudden increase in tension in lines 5 and 7 will not occur because float 12 must be tilted into the position shown in FIG. 6 and spring 44 must also be extended as shown in FIG. 6 before greater amounts of tension can be applied to lines 5 and 7.

It is to be understood that while certain forms of this invention have been illustrated and described, it is not limited thereto, except in so far as such limitations are included in the following claims and allowable equivalents thereof.

What is claimed is:

1. A fishing apparatus comprising:
   (a) a float having a passageway extending between opposing surfaces thereof,
   (b) a first fishing line having a proximate end and a distal end, said proximate end for securement for retrieval by an angler,
   (c) a second fishing line having a proximate end and a distal end, said distal end for attaching a fish catching device,
   (d) a first barrel swivel which is too large to enter said passageway of said float, said first barrel swivel attached to said distal end of said first fishing line,
   (e) a second barrel swivel which is too large to enter said passageway of said float, said second barrel swivel attached to said proximate end of said second fishing line,
   (f) a spring biased leader including a spring and a generally non-resilient leader line, said spring passing through the float passageway and connecting said first barrel swivel and said second barrel swivel, said spring for extending between an unextended length and an extended length, and said leader line also passing through the passageway and also connecting said first barrel swivel and said second barrel swivel, said leader line having a length which is greater than the unextended length of said spring and sufficient to allow extension of the spring when said second barrel swivel moves away from said first barrel swivel, whereby a fish striking upon said fish catching device may cause extension of said spring until said leader line is taut such that the fish then pulls against said first fishing line via said leader line.

2. The fishing apparatus of claim 1 wherein:
at least one of said first and second barrel swivels is replaced by a link element, said link element including at least one circlet having a diameter greater than said passageway of said float.

3. A fishing apparatus comprising:
(a) a float having an upper surface and a lower surface and a substantially straight and vertical passageway extending between said upper and lower surfaces,
(b) a first fishing line having a proximate end for securing to a fixed object for retrieval by an angler and a distal end,
(c) a second fishing line having a proximate end a distal end for attaching a fish catching device,
(d) a first barrel swivel located above said passageway of said attached to said distal end of said first fishing line, said barrel swivel including a portion that is wider than said passageway,
(e) a second barrel swivel located below said passageway of said float attached to said proximate end of said second fishing line having an opposite free end for carrying a fish catching device, the second barrel swivel also including a portion that is wider than said passageway,
(f) a spring biased leader including a spring and a generally non-resilient leader line, said spring passing through the float passageway and connecting said first barrel swivel and said second barrel swivel, said spring for extending between an unextended length and an extended length, and said leader line also passing through the passageway and also connecting said first barrel swivel and said second barrel swivel, said leader line having a length which is greater than the unextended length of said spring and sufficient to allow extension of the spring when said second barrel swivel moves away from said first barrel swivel, whereby, a fish striking at said distal end of the second fishing line pulls upon the spring biased leader causing said spring to extend until the non-resilient leader line is taut thus preventing further extension of said spring and thus opposing the forces applied by the fish with progressively increasing tension.

4. The fishing apparatus of claim 3, wherein,
said leader line is at least one inch longer than said spring when said spring is not extended and said spring has a spring constant of at least four pounds force per inch of extension.

5. The fishing apparatus of claim 3, wherein,
said leader line is at least one inch longer than said spring when said spring is not extended and said spring has a spring constant of substantially between six and ten pounds force per inch of extension.

6. The fishing apparatus of claim 3, wherein,
said upper surface of said float includes a raised portion and said passageway extends between said raised portion and said lower surface of the float.

7. The fishing apparatus of claim 3, wherein,
said upper surface of the float includes a raised portion and said lower surface of the float includes a recessed portion and said passageway extends between said raised portion and said recessed portion.

8. The fishing apparatus of claim 3, wherein,
said float is hollow and includes a valve for equalizing air pressure within said float with air pressure outside of said float.

9. The fishing apparatus of claim 3, wherein,
said float is hollow and includes a valve for equalizing air pressure within the float with air pressure outside of the float, and,
said upper surface of the float includes a raised portion and said lower surface of the float includes a recessed portion and said passageway extends between said raised portion and said recessed portion.

10. A method for deploying an unattended fishing line having a fishing line with a fish catching device disposed at the end thereof, comprising the steps of:
(a) obtaining a float,
(b) associating a first barrel swivel with said float such that said float supports said first barrel swivel,
(c) connecting a first fishing line to said first barrel swivel,
(d) connecting said first barrel swivel to a spring which can extend between an unextended length and an extended length,
(e) connecting said first barrel swivel to a substantially non-resilient leader line having a length greater than the unextended length of the spring,
(f) connecting a second barrel swivel to the ends of the spring and the leader line opposite said first barrel swivel,
(g) connecting to said second barrel swivel a second fishing line having a fish catching device at its distal end,
(h) securing the first fishing line to a fixed object for later retrieval, and,
(i) placing the float and the second fishing line in a body of water suitable for fishing.

11. The method of claim 10, wherein,
said first and second barrel swivels each have a widest portion larger in diameter than said spring,
said float includes a passageway having a diameter larger than the diameter of the spring and smaller than the widest portions of said barrel swivels, and,
said spring and the leader line pass through the passageway of the float and said first and second barrel swivels are respectively connected to opposite ends of said leader line and said spring.

12. The method of claim 10, wherein,
said leader line is at least one inch longer than said spring when unextended and said spring has a spring constant of at least four pounds force per inch of extension.

13. The method of claim 10, wherein,
at least one of said first and second barrel swivels is replaced by a link element, said link element including at least one circlet having a diameter greater than said passageway of said float.

* * * * *